United States Patent
Kobayashi

(10) Patent No.: US 12,506,839 B2
(45) Date of Patent: Dec. 23, 2025

(54) IMAGING APPARATUS, METHOD, AND STORAGE MEDIUM FOR GENERATING COMBINED IMAGES

(71) Applicant: CANON KABUSHIKI KAISHA, Tokyo (JP)

(72) Inventor: Satoru Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 18/185,290

(22) Filed: Mar. 16, 2023

(65) Prior Publication Data
US 2023/0308594 A1      Sep. 28, 2023

(30) Foreign Application Priority Data

Mar. 23, 2022  (JP) ................. 2022-047455

(51) Int. Cl.
| | | |
|---|---|---|
| G06T 5/00 | (2024.01) | |
| G06T 5/50 | (2006.01) | |
| G06V 10/25 | (2022.01) | |
| G06V 10/56 | (2022.01) | |
| G06V 10/60 | (2022.01) | |
| H04N 1/60 | (2006.01) | |

(52) U.S. Cl.
CPC ............. *H04N 1/60* (2013.01); *G06T 5/50* (2013.01); *G06V 10/25* (2022.01); *G06V 10/56* (2022.01); *G06V 10/60* (2022.01); *G06T 2207/10024* (2013.01); *G06T 2207/20221* (2013.01)

(58) Field of Classification Search
CPC ... G06T 2207/20221; G06T 5/50; G06T 5/90; G06T 2207/10024; G06T 5/00; G06V 10/25; G06V 10/56; G06V 10/60
See application file for complete search history.

(56) References Cited

U.S. PATENT DOCUMENTS

| | | | |
|---|---|---|---|
| 2015/0207973 A1* | 7/2015 | Iwasaki | H04N 23/73 348/229.1 |
| 2016/0127656 A1* | 5/2016 | Honda | H04N 23/72 348/229.1 |

(Continued)

FOREIGN PATENT DOCUMENTS

JP      2015136087 A      7/2015

OTHER PUBLICATIONS

Schöberl, Michael, et al. "Digital neutral density filter for moving picture cameras." Computational Imaging VIII. Vol. 7533. SPIE, 2010.*

(Continued)

*Primary Examiner* — Li Liu
(74) *Attorney, Agent, or Firm* — Canon U.S.A., Inc. IP Division

(57) ABSTRACT

An imaging apparatus includes at least one memory configured to store instructions, and at least one processor coupled to the at least one memory and configured to execute the instructions to detect a saturated region in each of a plurality of images, correct at least one of colors and brightness in the saturated region and generate a plurality of saturation corrected images, generate a first combined image using the plurality of saturation corrected images, generate a second combined image using the plurality of images, and combine the first combined image and the second combined image to generate a third combined image.

17 Claims, 14 Drawing Sheets

(56) References Cited

U.S. PATENT DOCUMENTS

2017/0142312 A1\* 5/2017 Dal Mutto ........... H04N 13/106
2024/0378849 A1\* 11/2024 Engler ...................... G06T 5/90

OTHER PUBLICATIONS

Ke, Peng, Cheolkon Jung, and Ying Fang. "Perceptual multi-exposure image fusion with overall image quality index and local saturation." Multimedia Systems 23 (2017): 239-250.\*
Moriyama, Daiki, et al. "Saturation-based multi-exposure image fusion employing local color correction." 2019 IEEE International Conference on Image Processing (ICIP). IEEE, 2019.\*

\* cited by examiner

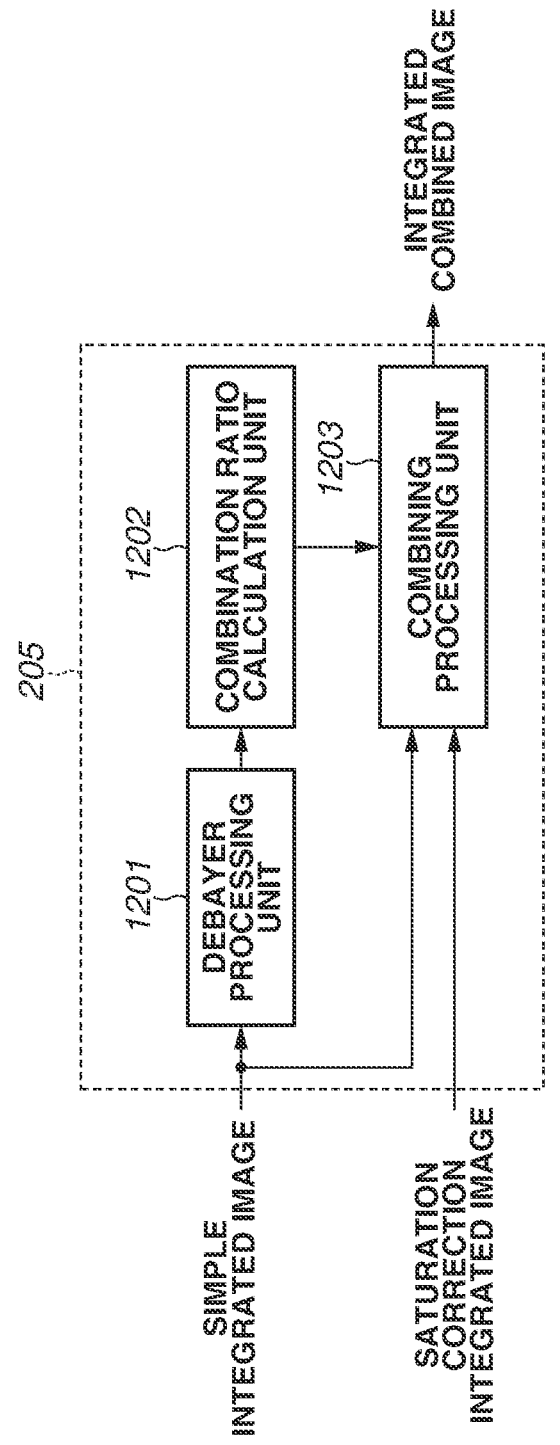

IMAGING APPARATUS, METHOD, AND STORAGE MEDIUM FOR GENERATING COMBINED IMAGES

BACKGROUND

Field

The present disclosure generally relates to an image processing apparatus, and especially relates to an imaging apparatus, an image processing method, and a storage medium for generating combined images.

Description of the Related Art

Japanese Patent Application Laid-Open No. 2015-136087 discusses a technique of combining a plurality of images captured while performing divided exposure without attachment of a physical neutral density (ND) filter, and thereby achieving prevention of overexposure or the like similarly to a case where the physical ND filter is attached.

However, there is case where when pixel values in a region of images captured while performing divided exposure are saturated, a phenomenon of a hue shift and a decrease in brightness occurs in a portion corresponding to the region in a combined image after subjected to averaging processing.

SUMMARY

The present disclosure has been made in consideration of the above-mentioned issue, and is directed to provision of an imaging apparatus capable of preventing occurrence of a hue shift and a decrease in brightness in a combined image when combining a plurality of images captured while performing divided exposure.

According to some embodiments, an imaging apparatus includes at least one memory configured to store instructions, and at least one processor coupled to the at least one memory and configured to execute the instructions to detect a saturated region in each of a plurality of images, correct at least one of colors and brightness in the saturated region and generate a plurality of saturation corrected images, generate a first combined image using the plurality of saturation corrected images, generate a second combined image using the plurality of images, and combine the first combined image and the second combined image to generate a third combined image.

Further features of the present disclosure will become apparent from the following description of exemplary embodiments with reference to the attached drawings.

BRIEF DESCRIPTION OF THE DRAWINGS

FIG. 12 is a diagram illustrating a configuration example of an integrated image combining unit according to some embodiments.

DESCRIPTION OF THE EMBODIMENTS

Various exemplary embodiments of the present disclosure will be described in detail below with reference to the accompanying drawings. The following exemplary embodiments do not limit the scope of the claimed invention, and all combinations of features described in the exemplary embodiments are not necessarily essential for solving the issues of the present disclosure.

In a first exemplary embodiment, generated is a combined image in which overexposure is suppressed by combining a plurality of images obtained by performing divided exposure (divided exposure images) without attachment of a physical neutral density (ND) filter.

Figure 1:
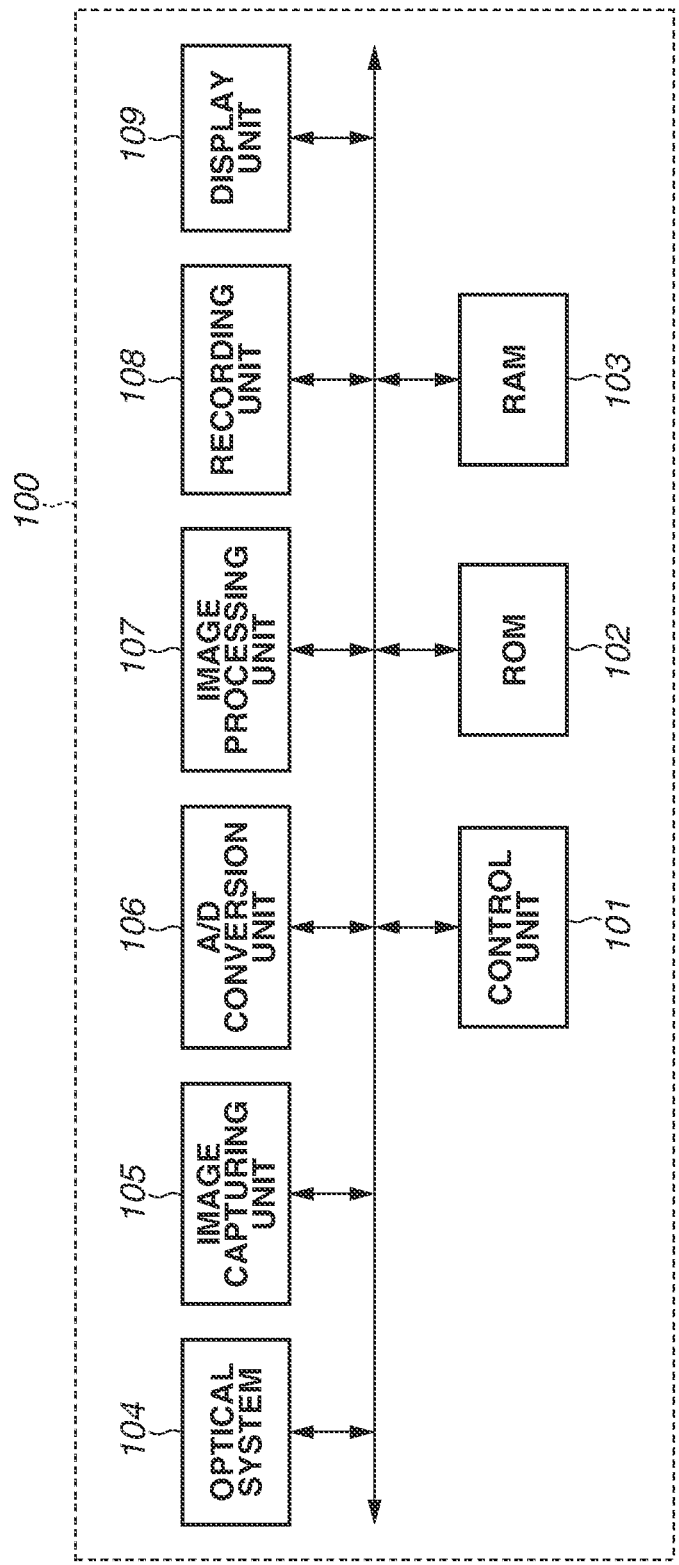
FIG. 1 is a block diagram illustrating an image capturing apparatus according to some embodiments.

FIG. 1 is a block diagram illustrating an image capturing apparatus according to the present exemplary embodiment. A configuration example according to the present exemplary embodiment is described below with reference to FIG. 1.

A control unit 101/is, for example, a central processing unit (CPU) including one or more processors, circuitry, or combinations thereof, and the control unit 101 reads out a control program for each block included in an image capturing apparatus 100 from a read-only memory (ROM) 102, loads the control program into a random-access memory (RAM) 103, which will be described below, and executes the control program.

The ROM 102 is an electrically erasable and recordable non-volatile memory, and the ROM 102 stores, in addition to an operation program for each block included in the image capturing apparatus 100, parameters or the like for operations of each block.

The RAM 103 is a rewritable volatile memory, and the RAM 103 is used for loading of a program executed by the control unit 101, temporary storage of data generated by the operations of each block included in the image capturing apparatus 100, and the like.

An optical system 104 is composed of a lens group including a zoom lens and a focus lens, and an aperture mechanism, and forms an object image on an imaging plane of an image capturing unit 105, which will be described below.

The image capturing unit 105 is, for example, an image sensor such as a charge-coupled device (CCD) sensor and a complementary metal-oxide semiconductor (CMOS) sensor. The image capturing unit 105 photoelectrically converts an optical image formed by the optical system 104 on the imaging plane of the image capturing unit 105, and outputs an obtained analog image signal to an analog/digital (A/D) conversion unit 106.

The A/D conversion unit 106 converts the input analog signal into digital image data and outputs the digital image data. The digital image data output from the A/D conversion unit 106 is temporarily stored in the RAM 103.

An image processing unit 107 performs various kinds of image processing on the image data stored in the RAM 103. Specifically, the image processing unit 107 performs various kinds of image processing for developing, displaying, and recording the digital image data, such as demosaicing processing, noise reduction processing, white balance correction processing, and gamma processing. The image processing unit 107 further includes a combining unit 200 that performs combining processing, which is a feature of the present exemplary embodiment. Details of the combining processing will be described below.

A recording unit 108 records data including image data in a built-in recording medium.

A display unit 109 includes a display device such as a liquid crystal display (LCD), and displays an image stored in the RAM 103 and an image recorded in the recording unit 108 on the display device. The display unit 109 also displays an operation user interface for accepting an instruction from a user.

Subsequently, a configuration example of the combining unit 200 included in the image processing unit 107, which is a feature of the present exemplary embodiment, is described with reference to FIG. 2.

Figure 2:
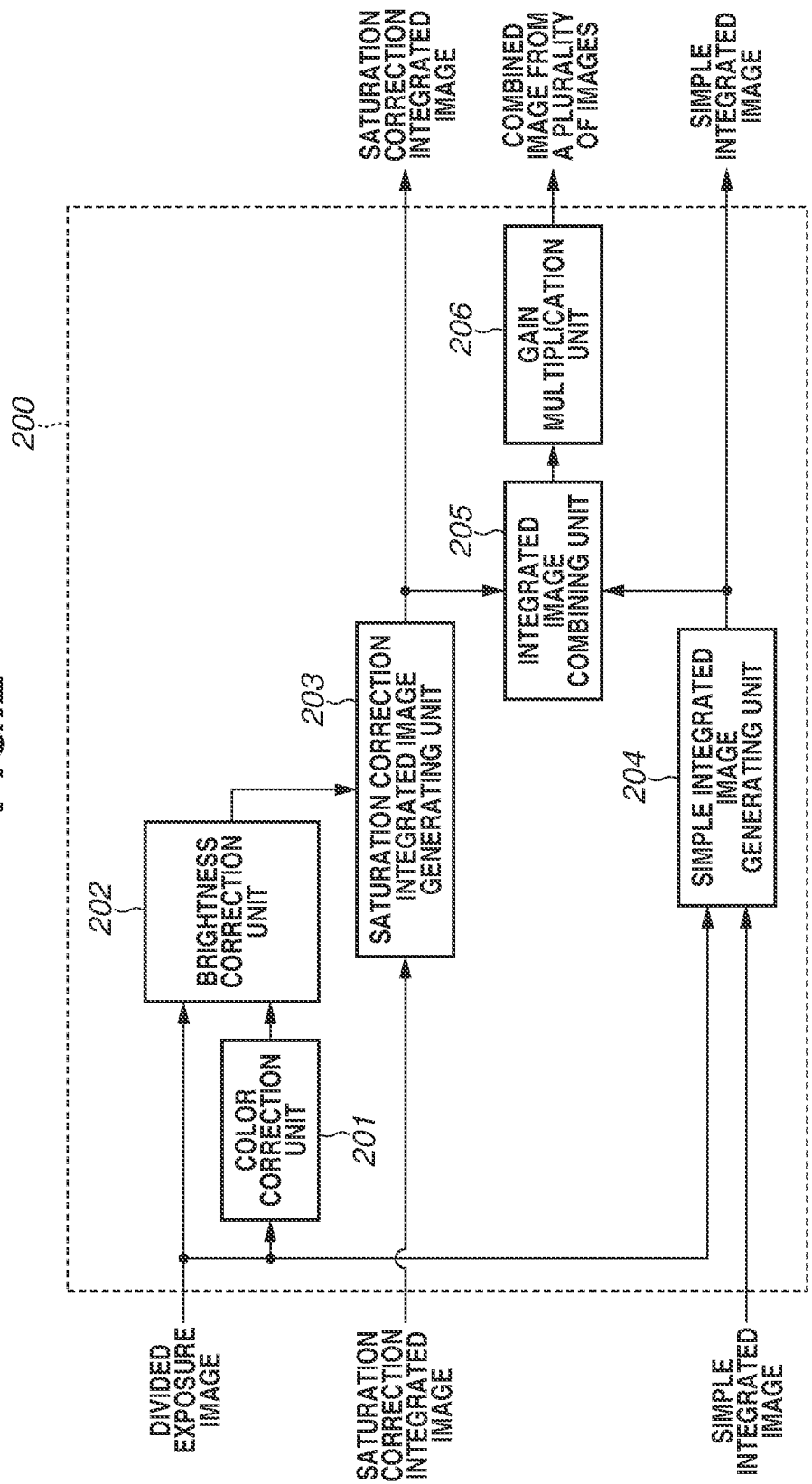
FIG. 2 is a diagram illustrating a configuration example of a combining unit according to some embodiments.

FIG. 2 is a diagram illustrating a configuration example of the combining unit 200 according to the present exemplary embodiment. The combining unit 200 includes a color correction unit 201, a brightness correction unit 202, a saturation correction integrated image generating unit 203, a simple integrated image generating unit 204, an integrated image combining unit 205, and a gain multiplication unit 206.

Subsequently, a flow of processing performed by the combining unit 200 to combine a plurality of divided exposure images is described in detail with reference to a flowchart in FIG. 3.

Figure 3:
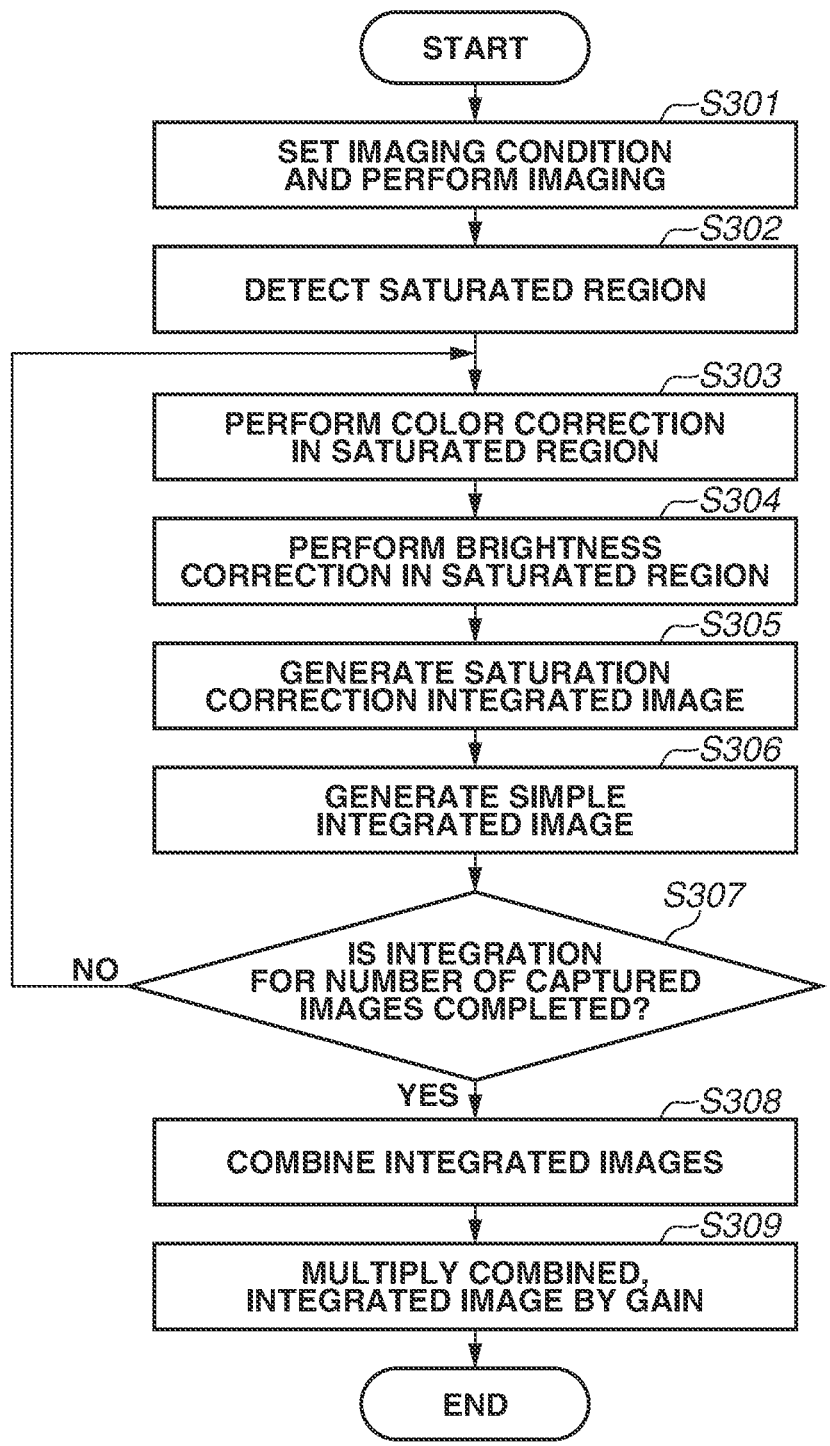
FIG. 3 is a flowchart illustrating a flow of processing performed by the combining unit according to some embodiments.

FIG. 3 is the flowchart illustrating the flow of processing performed by the combining unit 200 to combine a plurality of divided exposure images according to the present exemplary embodiment. In step S301, the control unit 101 sets an imaging condition, and causes the image capturing unit 105 to capture images under the set imaging condition.

Figure 4:
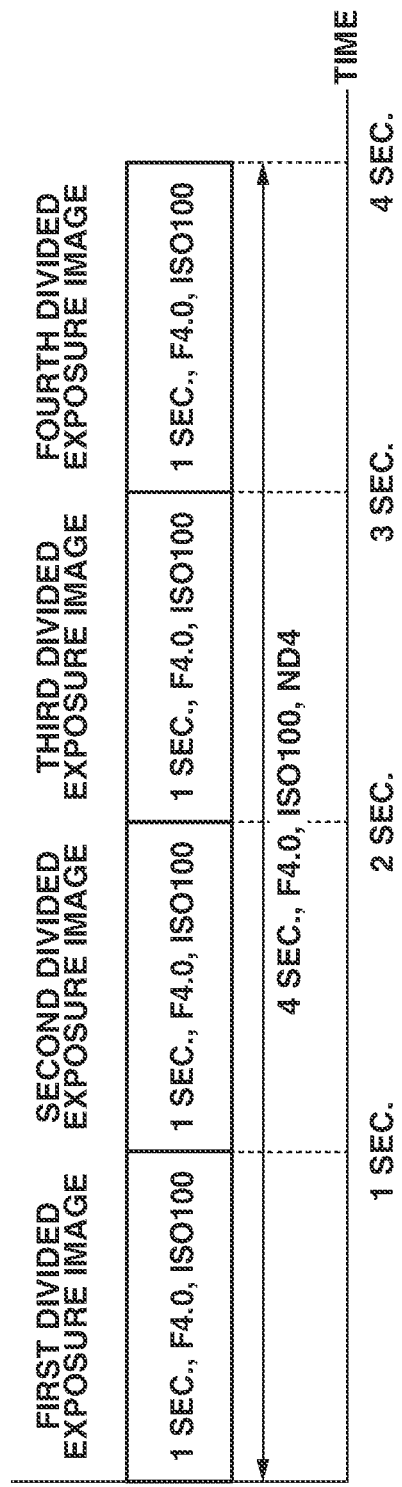
FIG. 4 is a diagram illustrating an example of an imaging condition according to some embodiments.

The setting of the imaging condition made by the control unit 101 is now described in detail with reference to FIG. 4. FIG. 4 schematically illustrates the imaging condition in an example of image capturing processing in a case where a user sets, as exposure conditions, shutter speed of four seconds, aperture stop of F4.0, International Standards Organization (ISO) sensitivity of the ISO 100, and ND density of ND4. The ND density mentioned here represents a degree of reduction in object light. For example, ND2 represents reduction of light by one level, ND4 represents reduction of light by two levels, and ND8 represents reduction of light by three levels. In the present disclosure, since the image capturing processing is performed without attachment of a physical ND filter, exposure for the amount of light to be reduced is decreased by increasing shutter speed. Thus, the control unit 101 sets the aperture stop and the ISO sensitivity set by the user as the imaging condition, and sets shutter speed by increasing the shutter speed set by the user by the amount of reduction of light due to the ND density. Specifically, in a case where the shutter speed is four seconds and the ND density is ND4 as illustrated in FIG. 4, it may be desirable to reduce light by two levels, and thus one second obtained as a result of increasing the shutter speed by two levels is set as the imaging condition for one divided exposure image. Furthermore, the control unit 101 sets the number of captured images such that total exposure time for the plurality of divided exposure images and the shutter speed set by the user are equal to each other. Since the exposure time for one divided exposure image is one second and the shutter speed set by the user is four seconds in the example illustrated in FIG. 4, the control unit 101 sets the number of captured images as four.

In the present exemplary embodiment, the description is given assuming that the same exposure is performed on each of the plurality of divided exposure images.

Shortening time in which exposure is not performed (non-exposure time) from the end of exposure of a divided exposure image to the start of exposure of the next divided exposure image as much as possible can smoothen the motion blur of a moving object.

When a shutter button (not illustrated) is pressed by the user, the control unit 101 starts processing for image-capturing. The control unit 101 controls the optical system 104 and the image capturing unit 105 based on the imaging condition set in step S301, and repeats capturing object light for the set number of captured images to generate divided exposure image data. In the present exemplary embodiment, examples of a format of the divided exposure image processed by the combining unit 200 include a Bayer-arrayed red-green-blue (RGB) format (BAYER-RAW). In this case, each divided exposure image is composed of R, G, B pixels having linear signal characteristics. However, the format of the divided exposure image is not limited thereto. For example, image formats, such as RGB 444, YUV 444, YUV 422, and ICtCp, may be employed.

In step S302, the image processing unit 107 detects a saturated region in the captured image. As an example, the image processing unit 107 detects a region having a pixel value that is more than or equal to a predetermined value in the captured image as the saturated region.

In step S303, the color correction unit 201 performs correction on the plurality of divided exposure images captured in step S301 to reduce color saturation of the saturated region to prevent a hue shift. Details of the color correction unit 201 will be described below. The hue shift mentioned herein represents a state where an original hue of an object and a hue on the image data are different from each other.

In step S304, the brightness correction unit 202 performs correction on the image data subjected to the color correction in step S303 to increase brightness of the saturated region in order to prevent a reduction in brightness. Details of the brightness correction unit 202 will be described below.

In step S305, the saturation correction integrated image generating unit 203 sequentially and cumulatively adds the image data subjected to the brightness correction in step S304 (referred to as a saturation corrected image) to generate a saturation correction integrated image.

In step S306, the simple integrated image generating unit 204 sequentially and cumulatively adds the divided exposure images captured in step S301 to generate a simple integrated image.

In step S307, the processing from steps S303 to S306 is repeated until the integration processing in steps S305 and S306 is performed for the number of captured images.

In step S308, the integrated image combining unit 205 combines the saturation correction integrated image and the simple integrated image. Details of the integrated image combining unit 205 will be described below.

In step S309, the gain multiplication unit 206 multiplies the integrated image data combined in step S308 by a gain of "one over the number of captured images" calculated by the control unit 101. That is, the gain multiplication unit 206 multiplies the combined, integrated image data obtained by integrating and combining the divided exposure images corresponding to the number of captured images by the gain of one over the number of captured images to perform averaging processing.

As described above, the combining unit 200 combines the plurality of divided exposure images. As a result, combining the plurality of divided exposure images for which shutter speed is set to be increased can decrease exposure by an amount of the set ND density without attachment of a physical ND filter. In the example illustrated in FIG. 4, the combining unit 200 combines four divided exposure images captured by performing exposure under exposure conditions of one second, F4.0, and ISO 100, which are decreased by two levels corresponding to ND4 from exposure conditions of four seconds, F4.0, and ISO 100, whereby a combined image in which overexposure is suppressed can be generated.

Subsequently, details of the color correction unit 201 included in the combining unit 200 are described with reference to FIGS. 5-7 and 11A to 11E.

Figure 5:
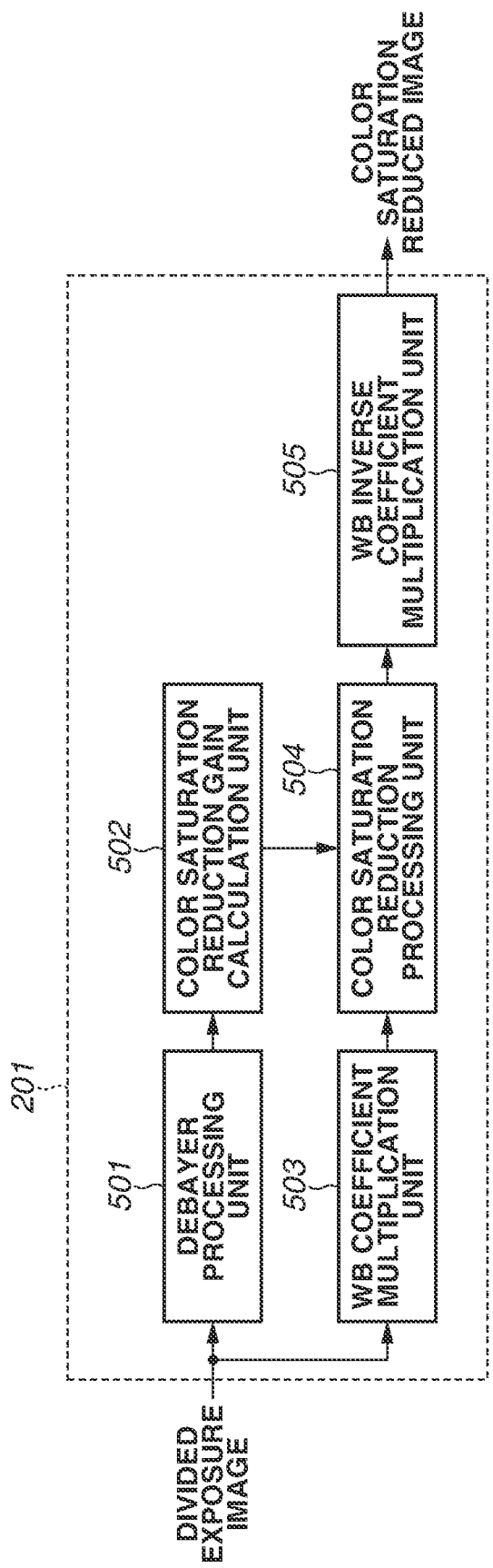
FIG. 5 is a diagram illustrating a configuration example of a color correction unit according to some embodiments.

FIG. 5 is a diagram illustrating a configuration example of the color correction unit 201 according to the present exemplary embodiment. The color correction unit 201 includes a debayer processing unit 501, a color saturation reduction gain calculation unit 502, a white balance (WB) coefficient multiplication unit 503, a color saturation reduction processing unit 504, and a WB inverse coefficient multiplication unit 505.

Subsequently, the flow of processing performed by the color correction unit 201 to reduce color saturation of the saturated region in the divided exposure images is described in detail with reference to a flowchart in FIG. 6.

Figure 6:
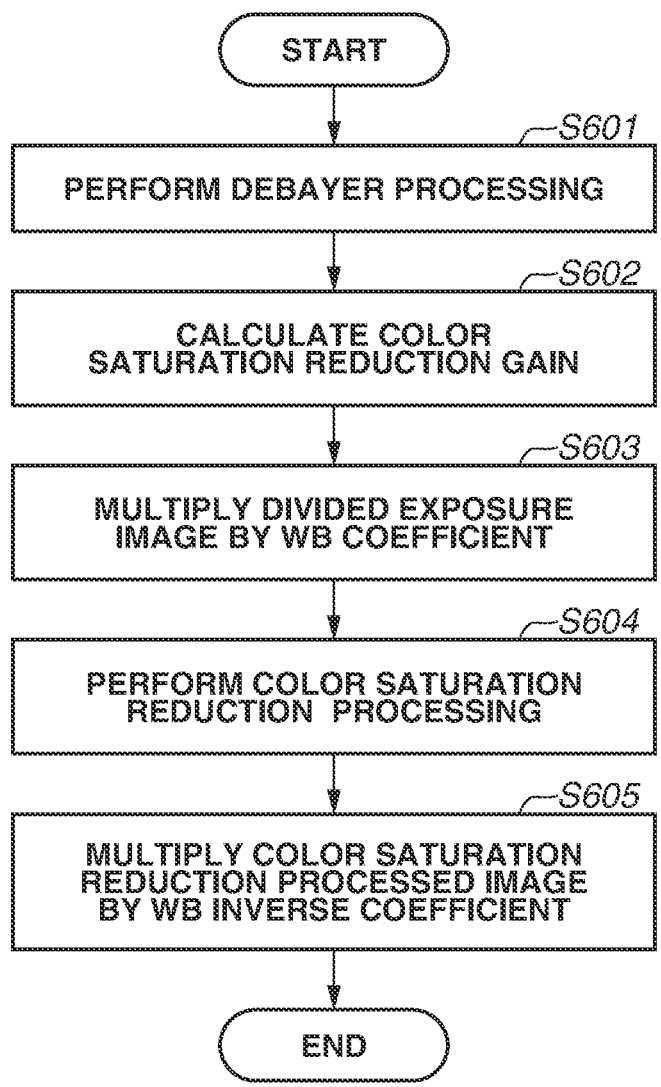
FIG. 6 is a flowchart illustrating a flow of processing performed by the color correction unit according to some embodiments.

FIG. 6 is a flowchart illustrating the flow of processing performed by the color correction unit 201 according to the present exemplary embodiment.

In step S601, the debayer processing unit 501 performs debayer processing on the divided exposure images in the BAYER-RAW format, and outputs image data in the RGB 444 format. Assume that the debayer processing according to the present exemplary embodiment employs a known method using interpolation processing with a smoothing filter, and a detailed description thereof is omitted.

Figure 7:
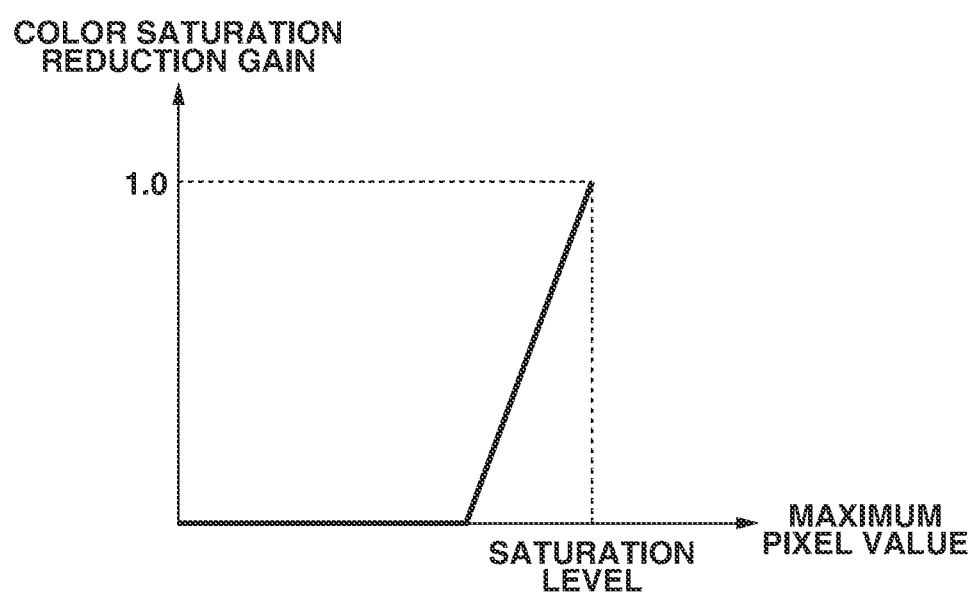
FIG. 7 is a diagram illustrating an example of a color saturation reduction gain calculation curve according to some embodiments.

In step S602, the color saturation reduction gain calculation unit 502 calculates color saturation reduction gain in the image data in the RGB 444 format, based on a maximum pixel value among a R pixel value, a G pixel value, and a B pixel value at a corresponding position. A method of calculating the color saturation reduction gain is described in detail with reference to FIG. 7. FIG. 7 is a diagram illustrating an example of a color saturation reduction gain calculation curve according to the exemplary embodiment of the present disclosure. As illustrated in FIG. 7, the color saturation reduction gain calculation unit 502 calculates a color saturation reduction gain such that the color saturation reduction gain increases as the maximum pixel value becomes closer to a saturation level after exceeding a certain value.

Figure 11A:
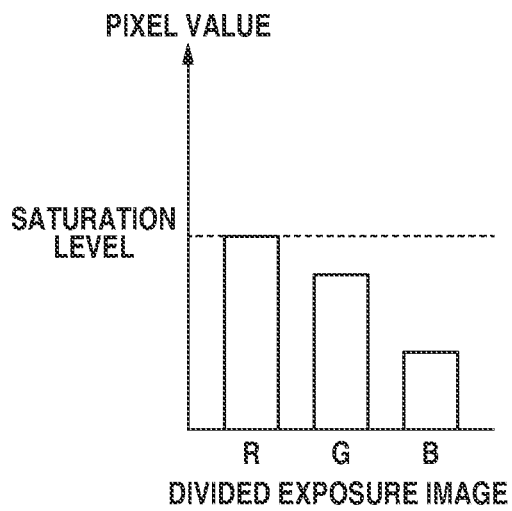
FIGS. 11A to 11E are diagrams illustrating a change in pixel values before and after image processing according to some embodiments.
Figure 11B:
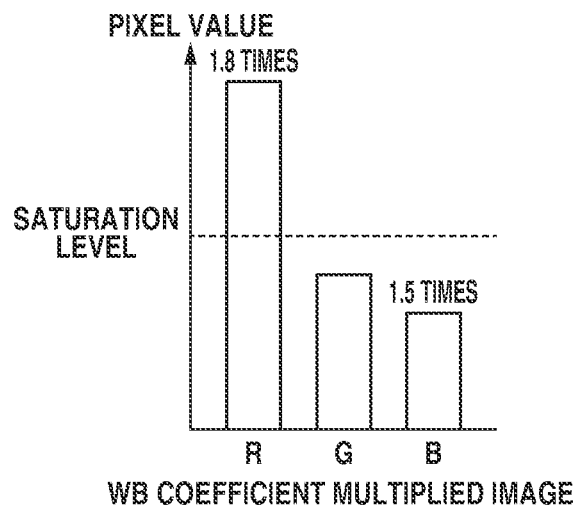

In step S603, the WB coefficient multiplication unit 503 multiplies the divided exposure images by a WB coefficient. FIGS. 11A to 11E are diagrams illustrating a change in pixel values before and after image processing according to the present exemplary embodiment. FIG. 11A illustrates the divided exposure image. FIG. 11B illustrates the image data obtained by multiplying the divided exposure image by the WB coefficient. FIG. 11B illustrates an example where the R pixel value becomes 1.8 times as large as the R pixel value in the divided exposure image, and the B pixel value becomes 1.5 times as large as the B pixel value in the divided exposure image as a result of multiplying the divided exposure image by the WB coefficient. The WB coefficient multiplication unit 503 multiplies the divided exposure image illustrated in FIG. 11A by the WB coefficient on a color-by-color basis, and outputs a WB coefficient multiplied image as indicated in FIG. 11B.

In step S604, the color saturation reduction processing unit 504 performs color saturation reduction processing on the image data multiplied by the WB coefficient in step S603, based on the color saturation reduction gain calculated in step S602. Specifically, the color saturation reduction processing unit 504 performs color saturation reduction processing based on the following Equations (1) and (2).

$$SAT\_Rwb = (Rwb - G) \times (1.0 - SAT\_GAIN) + G \quad (1)$$

$$SAT\_Bwb = (Bwb - G) \times (1.0 - SAT\_GAIN) + G \quad (2)$$

SAT_Rwb represents the R pixel value subjected to the color saturation reduction processing, and SAT_Bwb represents the B pixel value subjected to the color saturation reduction processing. Rwb represents the R pixel value of the WB coefficient multiplied image. G represents the G pixel value of the WB coefficient multiplied image. Bwb represents the B pixel value of the WB coefficient multiplied image. SAT_GAIN represents the color saturation reduction gain. In the present exemplary embodiment, the color saturation reduction processing unit 504 outputs the G pixel value without performing any processing thereon.

Figure 11C:
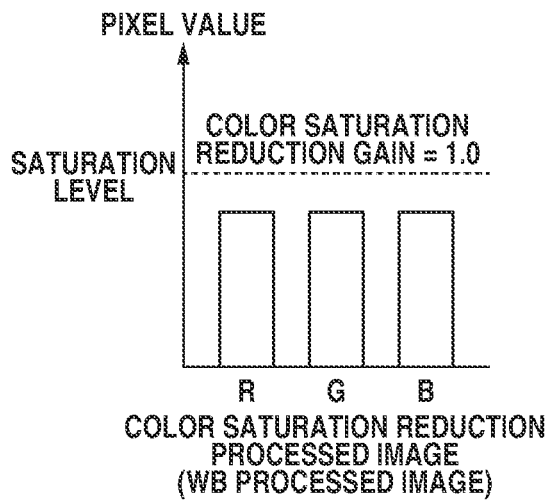

FIG. 11C indicates pixel values obtained by performing color saturation reduction processing on the WB coefficient multiplied image.

According to Equations (1) and (2), when SAT_GAIN is the maximum value of 1.0, the pixel value of SAT_Rwb and the pixel value of SAT_Bwb become equal to the G pixel value as illustrated in FIG. 11C, and a portion subjected to the color saturation reduction processing becomes achromatic. That is, Equations (1) and (2) represent processing of controlling how much the R pixel value and the B pixel value are approximated to the G pixel value by the color saturation reduction gain and reducing color saturation.

Figure 11D:
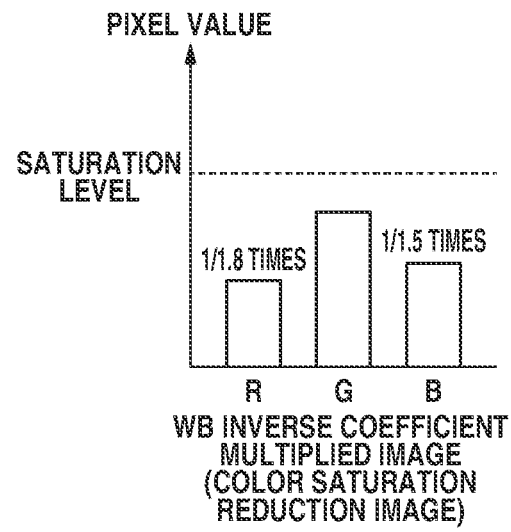

In step S605, the WB inverse coefficient multiplication unit 505 multiplies the color saturation reduction processed image subjected to the WB processing by a WB inverse coefficient. FIG. 11D illustrated the image data obtained by multiplying the color saturation reduction processed image subjected to the WB processing by the WB inverse coefficient. FIG. 11D illustrates an example where the R pixel value and the B pixel value respectively become 1/1.8 times and 1/1.5 times as large as those in the color saturation reduction processed image as a result of multiplying the color saturation reduction processed image by the WB inverse coefficient. The WB inverse coefficient multiplication unit 505 multiplies the color saturation reduction processed image subjected to the WB processing by the WB inverse coefficient on a color-by-color basis, generates a WB inverse multiplication image as illustrated in FIG. 11D, and outputs the WB inverse multiplication image as a color saturation reduced image that is not subjected to the WB processing.

As described above, reducing color saturation in a region having pixel values that are close to the saturation level in the divided exposure image can prevent a hue shift that occurs in a combined image generated from a plurality of images.

In the present exemplary embodiment, the description has been given of the example of inputting/outputting the BAYER-RAW format image data that is not multiplied by the WB coefficient, but the input/output image data may be data multiplied by the WB coefficient. In this case, the WB coefficient multiplication processing in step S603 and the WB inverse coefficient multiplication processing in step S605 of the flowchart in FIG. 6 need not be performed.

Subsequently, details of the brightness correction unit 202 included in the combining unit 200 are described with reference to FIGS. 8-10 and 11A to 11E.

Figure 8:
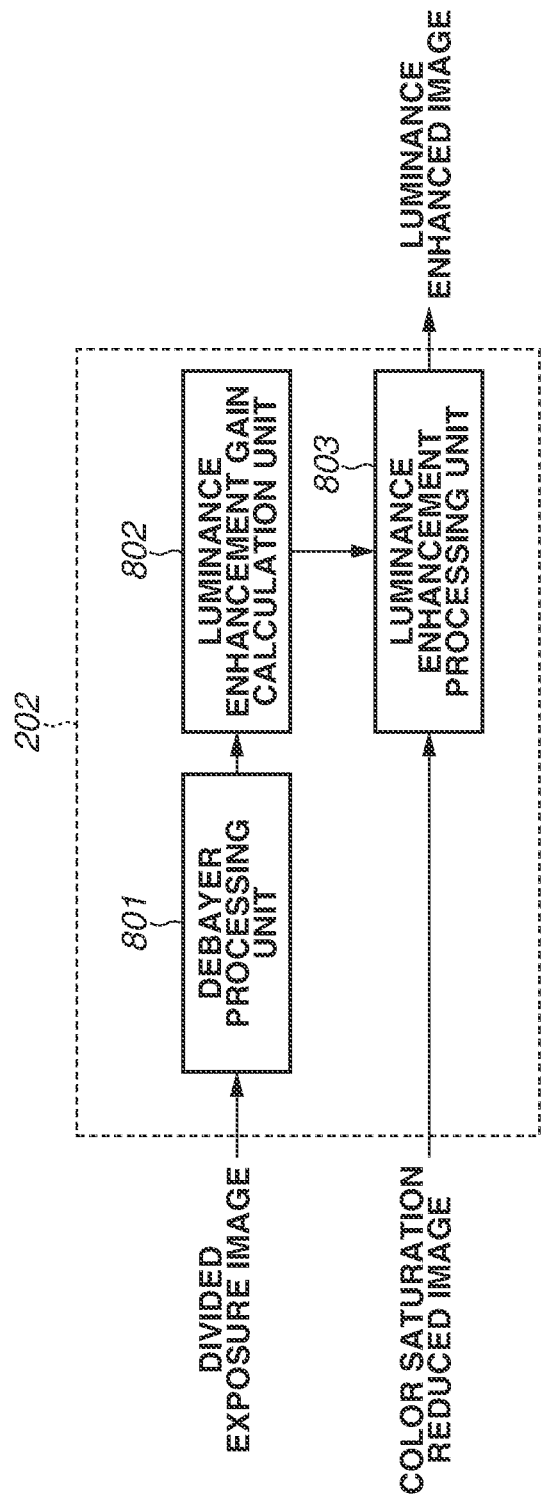
FIG. 8 is a diagram illustrating a configuration example of a brightness correction unit according to some embodiments.

FIG. 8 is a diagram illustrating a configuration example of the brightness correction unit 202 according to the present exemplary embodiment. The brightness correction unit 202 includes a debayer processing unit 801, a luminance enhancement gain calculation unit 802, and a luminance enhancement processing unit 803.

Next, a flow of processing performed by the brightness correction unit 202 to increase brightness of a region in the color saturation reduced image corresponding to the saturated region in the divided exposure image is described in detail with reference to a flowchart in FIG. 9.

Figure 9:
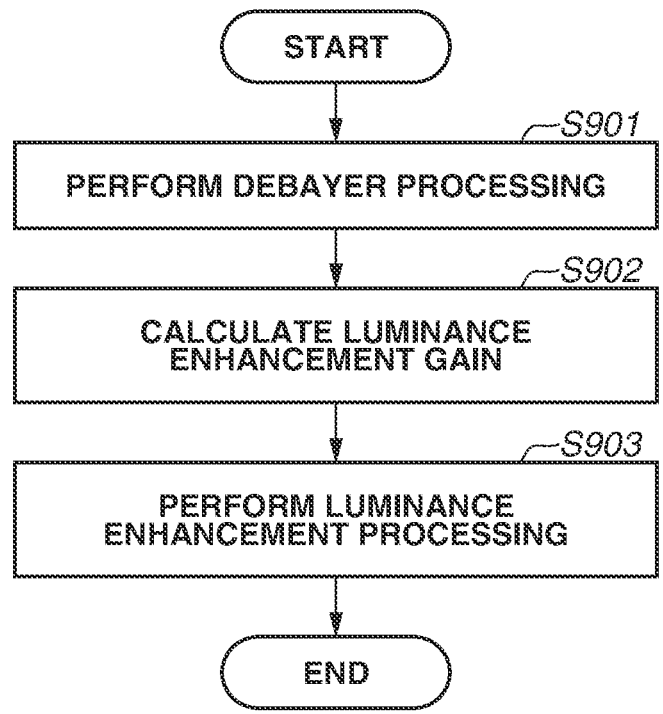
FIG. 9 is a flowchart illustrating a flow of processing performed by the brightness correction unit according to some embodiments.

FIG. 9 is a flowchart illustrating the flow of processing performed by the brightness correction unit 202 according to the present exemplary embodiment. In step S901, the debayer processing unit 801 performs debayer processing on the divided exposure image in the BAYER-RAW format, and outputs image data in the RGB 444 format. Assume that the debayer processing according to the present exemplary embodiment employs a known method using interpolation processing with a smoothing filter, and a detailed description thereof is omitted.

Figure 10:
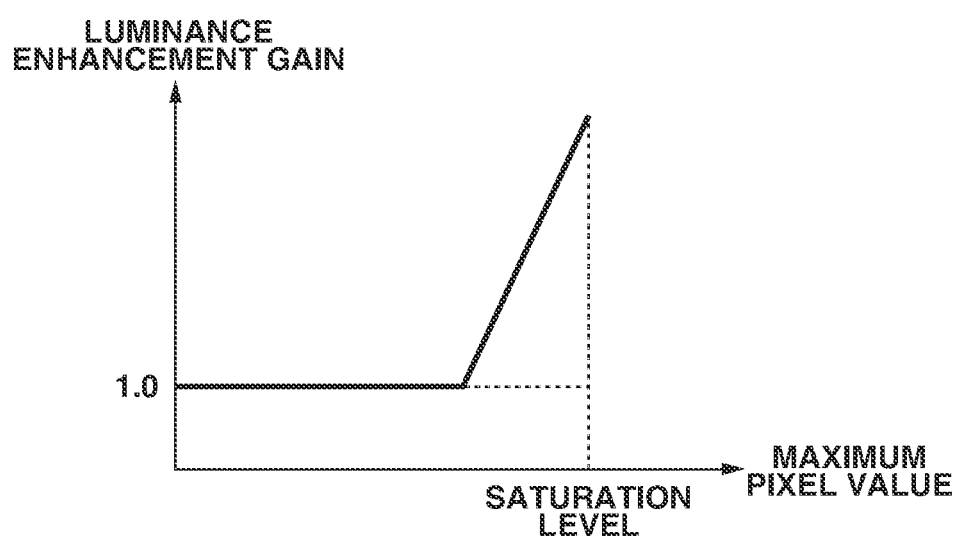
FIG. 10 is a diagram illustrating an example of a luminance enhancement gain calculation curve according to some embodiments.

In step S902, the luminance enhancement gain calculation unit 802 calculates luminance enhancement gain based on a maximum pixel value among a R pixel value, a G pixel value, and a B pixel value at a corresponding position in the image data in the RGB 444 format. A method of calculating the luminance enhancement gain is described in detail with reference to FIG. 10. FIG. 10 is a diagram illustrating an example of a luminance enhancement gain calculation curve according to the present exemplary embodiment. As illustrated in FIG. 10, the luminance enhancement gain calculation unit 802 calculates a luminance enhancement gain such the luminance enhancement gain increases as the maximum pixel value becomes closer to the saturation level. The luminance enhancement gain is 1.0 (no gain) when the maximum pixel value is small.

In step S903, the luminance enhancement processing unit 803 multiplies the color saturation reduced image by the luminance enhancement gain calculated in step S902. Specifically, the color saturation reduced image is multiplied by the luminance enhancement gain based on the following Equations (3), (4), and (5).

$$BRT\_R = SAT\_R \times BRT\_GAIN \quad (3)$$

$$BRT\_G = SAT\_G \times BRT\_GAIN \quad (4)$$

$$BRT\_B = SAT\_B \times BRT\_GAIN \quad (5)$$

BRT_R represents the R pixel value multiplied by the luminance enhancement gain. BRT_G represents the G pixel value multiplied by the luminance enhancement gain. BRT_B represents the B pixel value multiplied by the luminance enhancement gain. SAT_R represents the R pixel value of the color saturation reduced image. SAT_G represents the G pixel value of the color saturation reduced image. SAT_B represents the B pixel value of the color saturation reduced image. BRT_GAIN represents the luminance enhancement gain.

Figure 11E:
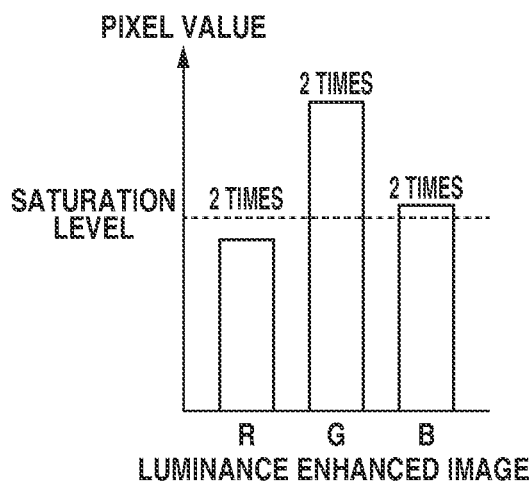

FIG. 11E illustrates pixel values of a luminance enhanced image obtained by multiplying the WB inverse coefficient multiplied image (color saturation reduced image) in FIG. 11D by twice the luminance enhancement gain.

The luminance enhancement processing unit 803 performs correction to increase brightness of the color saturation reduced image by multiplying the color saturation reduced image by the luminance enhancement gain as expressed by Equations (3), (4), and (5), and outputs the luminance enhanced image.

As described above, increasing the brightness of the region in the color saturation reduced image corresponding to the region having pixel values that are close to the saturation level in the divided exposure image can prevent a decrease in brightness that occurs in the combined image generated from the plurality of images.

Next, details of the integrated image combining unit 205 included in the combining unit 200 are described with reference to FIGS. 12-14.

FIG. 12 is a diagram illustrating a configuration example of the integrated image combining unit 205 according to the present exemplary embodiment. The integrated image combining unit 205 includes a debayer processing unit 1201, a combination ratio calculation unit 1202, and a combining processing unit 1203.

Subsequently, a flow of processing performed by the integrated image combining unit 205 to combine the saturation correction integrated image and the simple integrated image are described in detail with reference to a flowchart in FIG. 13.

Figure 13:
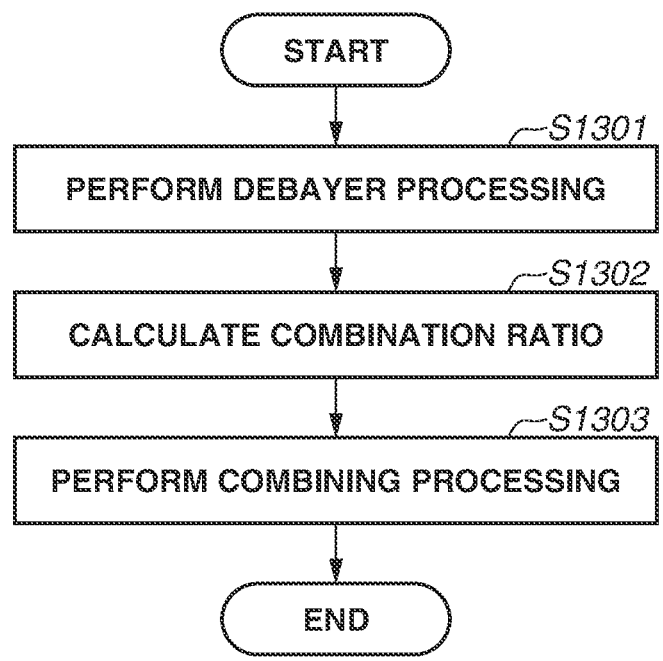
FIG. 13 is a flowchart illustrating a flow of processing performed by the integrated image combining unit according to some embodiments.
Figure 14:
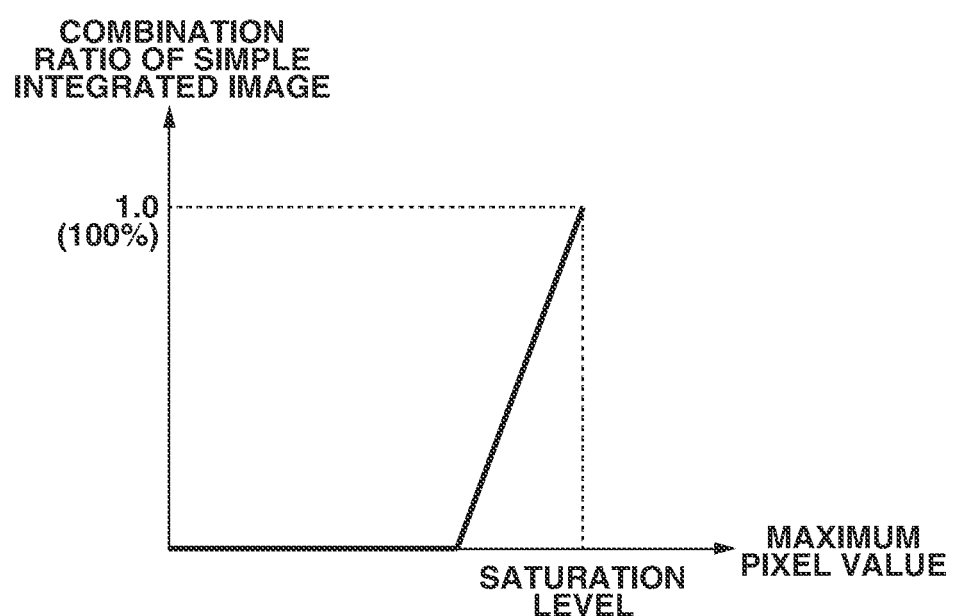
FIG. 14 is a diagram illustrating an example of a combination ratio calculation curve according to some embodiments.

FIG. 13 is a flowchart illustrating the flow of processing performed by the integrated image combining unit 205 according to the exemplary embodiment.

In step S1301, the debayer processing unit 1201 performs debayer processing on the simple integrated image in the BAYER-RAW format, and outputs image data in the RGB 444 format. Assume that the debayer processing according to the present exemplary embodiment employs a known method using interpolation processing with a smoothing filter, and a detailed description thereof is omitted.

In step S1302, the combination ratio calculation unit 1202 calculates a combination ratio based on a maximum pixel value among an R pixel value, a G pixel value, and a B pixel value at a corresponding position in the image data in the RGB 444 format. A method of calculating the combination ratio is described in detail with reference to FIG. 14, which illustrates an example of a combination ratio calculation curve according to the present exemplary embodiment. As illustrated in FIG. 14, the combination ratio calculation unit 1202 calculates the combination ratio of the simple integrated image such that the combination ratio increases as the maximum pixel value becomes closer to a saturation level of the integrated image after exceeding a certain value. The saturation level of the integrated image mentioned here is a value obtained by multiplying the saturation level of the divided exposure image by the number of integrated images.

The description is now given of a reason that the combination ratio calculation unit 1202 calculates the combination ratio such that the combination ratio of the simple integrated image becomes higher as the maximum pixel value becomes closer to the saturation level of the integrated image. In a portion of the saturation correction integrated image corresponding to a saturated region where an object remains still in the divided exposure image, color saturation is reduced, and also brightness is enhanced. In contrast, in a portion of the simple integrated image corresponding to the saturated region where the object remains still in the divided exposure image, image quality is roughly equivalent to image quality that can be achieved with a physical ND filter attached. Thus, the combination ratio calculation unit 1202 increases the combination ratio of the simple integrated image with respect to the saturated region where the object remains still in the divided exposure image.

Since respective portions in all the divided exposure images corresponding to the saturated region where the object remains still in the divided exposure image have pixel values that are close to the saturation level, a region in the simple integrated image corresponding to the foregoing region has pixel values that are close to the saturation level of the integrated image. In contrast, in a saturated region where the object is moving in the divided exposure image, there are both of a case where the portion in the divided exposure image has pixel values that are close to the saturation level and a case where the portion in the divided exposure image does not have pixel values that are close to the saturation level because of the movement of the object. Hence, a region of the simple integrated image corresponding to the saturated region where the object is moving in the divided exposure image has low pixels values that are far from the saturation level of the integrated image.

Thus, the combination ratio calculation unit 1202 calculates the combination ratio such that the combination ratio of the simple integrated image becomes higher as the maximum pixel value in the simple integrated image becomes closer to the saturation level of the integrated image, whereby the combination ratio of the simple integrated image becomes higher in the saturated region where the object remains still in the divided exposure image.

In step S1303, the combining processing unit 1203 combines the saturation correction integrated image and the simple integrated image based on the combination ratio calculated in step S1302, and outputs a combined image as an integrated, combined image.

As described above, by combining the saturation correction integrated image and the simple integrated image, it is possible to increase the ratio of the simple integrated image in the region of the saturation correction integrated image corresponding to the region having pixel values that are close to the saturation level of the simple integrated image.

In the present exemplary embodiment, the description has been given of the example in which the combining unit 200 performs both the color correction and the brightness correction on the saturated region in the divided exposure image, but the combining unit 200 may perform only the color correction or only the brightness correction.

Further, in the present exemplary embodiment, the description has been given of the example in which the integrated image combining unit 205 calculates the combination ratio based on the simple integrated image, but the integrated image combining unit 205 may calculate the combination ratio based on the saturation correction integrated image. In a case where the combination ratio is calculated based on the saturation correction integrated image, the pixel values of the saturation correction integrated image are changed by the color correction and the brightness correction. Thus, the saturation level of the integrated image should be changed in accordance with an amount of change in pixel values of the saturation correction integrated image.

In a case where the combining unit 200 performs only the color correction on the saturated region in the divided exposure image without performing the brightness correction, a G pixel value in the simple integrated image and a G pixel value in the saturation correction integrated image are identical, and thus the integrated image combining unit 205 may calculate the combination ratio based on the G pixel value of the saturation correction integrated image.

In the present exemplary embodiment, the description has been given of the example in which the gain multiplication unit 206 multiplies the combined, integrated image by a gain, but an image to be subjected to the multiplication by the gain is not limited thereto. For example, the gain multiplication unit 206 may perform processing of combining images obtained by multiplying each of the saturation correction integrated image and the simple integrated image by the gain.

OTHER EXEMPLARY EMBODIMENTS

While the description has been given based on a personal digital camera in the above-mentioned exemplary embodiment, an apparatus to which the exemplary embodiment is applied implements a combining function, and the exemplary embodiment can be also applied to a mobile device, a smartphone, a network camera connected to a server, and the like.

The present disclosure can also be implemented by supplying a program for implementing one or more functions of the above-mentioned exemplary embodiments to a system or an apparatus via a network or a storage medium, and causing one or more processors in a computer of the system or the apparatus to read and execute the program. Furthermore, the present disclosure can be implemented by a circuit (e.g., application-specific integrated circuit (ASIC)) for implanting one or more functions.

According to the present disclosure, adjusting at least one of brightness and colors of a saturated region in a plurality of images can prevent a hue shift and a decrease in brightness in a combined image generated from the plurality of images.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-047455, filed Mar. 23, 2022, which is hereby incorporated by reference herein in its entirety.

What is claimed is:

1. An imaging apparatus comprising:
at least one memory configured to store instructions; and
at least one processor coupled to the at least one memory and configured to execute instructions to:
detect a saturated region in each of a plurality of images;
correct at least one of colors and brightness in the saturated region and generate a plurality of saturation corrected images;
generate a first combined image using the plurality of saturation corrected images;
generate a second combined image using the plurality of images; and
combine the first combined image and the second combined image to generate a third combined image.

2. The imaging apparatus according to claim 1, wherein the at least one processor is further configured to execute the instructions to generate the third combined image based on a pixel value of the second combined image.

3. The imaging apparatus according to claim 1, wherein the at least one processor is further configured to execute the instructions to generate the third combined image based on a pixel value of the first combined image.

4. The imaging apparatus according to claim 1, wherein the at least one processor is further configured to execute the instructions to integrate the plurality of saturation corrected images to generate the first combined image.

5. The imaging apparatus according to claim 1, wherein the at least one processor is further configured to execute the instructions to integrate the plurality of images to generate the second combined image.

6. The imaging apparatus according to claim 1, wherein the at least one processor is further configured to execute the instructions to perform gain multiplication on the third combined image.

7. The imaging apparatus according to claim 1, further comprising a gain multiplication unit configured to:
perform gain multiplication on the first combined image and the second combined image; and
combine the first combined image and the second combined image, which have been subjected to the gain multiplication, and generate the third combined image.

8. The imaging apparatus according to claim 1, wherein the at least one processor is further configured to execute the instructions to perform correction so as to reduce color saturation of the saturated region.

9. The imaging apparatus according to claim 1, wherein the at least one processor is further configured to execute the instructions to perform correction so as to increase brightness of the saturated region.

10. The imaging apparatus according to claim 1, wherein the at least one processor is further configured to execute the instructions to detect the saturated region based on pixel values of the plurality of images.

11. The imaging apparatus according to claim 1, wherein the at least one processor is further configured to execute the instructions to detect a region having the pixel value that is more than or equal to a predetermined value as the saturated region.

12. The imaging apparatus according to claim 1, wherein the plurality of images includes a red (R) pixel, a green (G) pixel, and a blue (B) pixel having linear signal characteristics.

13. The imaging apparatus according to claim 1, wherein exposures of the plurality of image are same.

14. An imaging apparatus comprising:
an image sensor configured to capture a plurality of images;
at least one memory configured to store instructions; and
at least one processor coupled to the at least one memory and configured to execute the instructions to:
detect a saturated region in each of the plurality of images;
to correct at least one of colors and brightness in the saturated region and generate a plurality of saturation corrected images;
generate a first combined image using the plurality of saturation corrected images;
generate a second combined image using the plurality of images; and
combine the first combined image and the second combined image to generate a third combined image.

15. The imaging apparatus according to claim 14, wherein the image sensor is configured to capture the plurality of images without attachment of a neutral density (ND) filter.

16. An image processing method comprising:
detecting a saturated region in each of a plurality of images;
correcting at least one of colors and brightness in the saturated region and generating a plurality of saturation corrected images;
generating a first combined image using the plurality of saturation corrected images;
generating a second combined image using the plurality of images; and
combining the first combined image and the second combined image to generate a third combined image.

17. A non-transitory computer-readable storage medium which stores instructions for causing a computer of an apparatus to execute a method, the method comprising:
detecting a saturated region in each of a plurality of images;

correcting at least one of colors and brightness in the saturated region and generating a plurality of saturation corrected images;
generating a first combined image using the plurality of saturation corrected images;
generating a second combined image using the plurality of images; and
combining the first combined image and the second combined image to generate a third combined image.

* * * * *